(12) United States Patent
Wu

(10) Patent No.: US 7,613,526 B2
(45) Date of Patent: Nov. 3, 2009

(54) CONTROL SYSTEM FOR A RECIPROCATING OBJECT

(76) Inventor: Chichun Wu, Xiakou Shaling Industrial Zone, Dongchen District, Dongguan City, Guangdong Province (CN) 523115

( * ) Notice: Subject to any disclaimer, the term of this patent is extended or adjusted under 35 U.S.C. 154(b) by 202 days.

(21) Appl. No.: 11/812,771

(22) Filed: Jun. 21, 2007

(65) Prior Publication Data
US 2008/0097648 A1 Apr. 24, 2008

(30) Foreign Application Priority Data
Oct. 20, 2006 (CN) .............. 2006 2 0139314 U

(51) Int. Cl.
*G05B 15/00* (2006.01)
*G05B 11/01* (2006.01)
*A61H 7/00* (2006.01)
*A61H 19/00* (2006.01)

(52) U.S. Cl. .............. 700/1; 700/11; 318/569; 318/671; 123/27; 123/339; 123/438; 601/2; 601/16; 601/94; 601/95; 601/139

(58) Field of Classification Search .............. 700/1, 700/11; 318/569, 671; 123/27, 339, 438; 601/2, 16, 94, 95, 139
See application file for complete search history.

(56) References Cited

U.S. PATENT DOCUMENTS

| 4,015,488 | A | | 4/1977 | Akeson et al. |
| 4,418,499 | A | * | 12/1983 | Shirai .......................... 451/14 |
| 6,551,450 | B1 | * | 4/2003 | Thomas et al. ........... 156/580.1 |
| 6,643,193 | B2 | * | 11/2003 | Yamaki et al. ......... 365/189.09 |
| 6,786,878 | B2 | * | 9/2004 | Dehli .......................... 601/16 |
| 6,850,849 | B1 | * | 2/2005 | Roys ........................... 702/45 |
| 2001/0043450 | A1 | * | 11/2001 | Seale et al. ................. 361/160 |
| 2002/0097002 | A1 | | 7/2002 | Lai et al. |
| 2005/0080975 | A1 | | 4/2005 | Elledge et al. |
| 2005/0188137 | A1 | | 8/2005 | Fujiki |
| 2006/0282026 | A1 | * | 12/2006 | Glen et al. .................... 601/98 |
| 2008/0097253 | A1 | * | 4/2008 | Pedersen et al. ............... 601/2 |

* cited by examiner

*Primary Examiner*—Ramesh B Patel
(74) *Attorney, Agent, or Firm*—Stites & Harbison PLLC; Juan Carlos A. Marquez, Esq.

(57) ABSTRACT

The present invention is related to a control system of the reciprocating object comprising a microprocessor (01), a reciprocating mode control circuit (02), a reciprocating travel control circuit (03), a power supply circuit (04) and a motor driving circuit (05), with the microprocessor (01) provided with matrix type on-off signal input-outputs. The reciprocating mode control circuit (02) consists of matrix column branches and matrix row branches, allowing the limited number of the on-off signal ports of the microprocessor (01) to be connected to a plurality of on-off controlling elements thereby realizing a multiple of control modes and diversifying the control modes. The circuit construction according to the present invention is relatively simple, which is helpful to a tidy wiring and layout of the elements and therefore the circuit is easy for manufacturing, assembling, trouble shooting and maintenance.

7 Claims, 3 Drawing Sheets

CONTROL SYSTEM FOR A RECIPROCATING OBJECT

TECHNICAL FIELD

The present invention is related to a control system for a reciprocating object, especially to a multi-travel control system for the reciprocating object.

BACKGROUND OF THE INVENTION

Generally, a typical control system for a reciprocating object includes a microprocessor, a limit switch, a drive circuit, a keyboard and a display. A position signal exerted by the limit switch is inputted to the microprocessor as the measurement of the travel of the object. The microprocessor provides the drive circuit with a control signal to define the next movement of the object depending on a command from the keyboard and a position feedback signal. The display is used for displaying the working status and the control mode of the control system. In a control system for a small-sized reciprocating object, usually a button and an indicating lamp are used instead of the keyboard and the display in order to reduce cost and save space. However, when the movement modes of the object are complex, for example, in the case of a plurality of different selectable travel modes, it is necessary to provide a plurality of buttons to define the control modes, and to provide a plurality of indicating lamps to indicate the working status. This requires the microprocessor to have a number of on-off signal input/output ports, resulting in greater complexity for the microprocessor and its control circuit.

SUMMARY OF INVENTION

The object of the present invention is to provide a moving object control system requiring a relatively lower number of on-off signal ports of a microprocessor and a simpler electrical circuit in order to eliminate the drawbacks of the multi-channel on-off single input/output of the existing control system for a small reciprocating object. The control system according to the present invention satisfies the requirements of multiple control modes and working status for a reciprocating object control system with a limited number of on-off signal input/output channels of the microprocessor.

The control system for a reciprocating object according to the present invention comprises a microprocessor having matrix-type, on-off signal input/output ports, a reciprocating mode control circuit, a reciprocating travel control circuit, a power supply circuit providing a signal power supply to the microprocessor, the reciprocating mode control circuit and the reciprocating travel contort circuit, and providing a power supply to the motor driving circuit, and a motor driving circuit. Control signal outputs of the microprocessor are connected to inputs (MOTO1, MOTO2) of the motor driving circuit.

In the reciprocating mode control circuit according to the present invention:

the signal power supply is connected to a matrix column signal port of the microprocessor via a voltage dropping resistor in a column branch, and the matrix column signal port is connected to a contact of a control button at one side via a column branch current limiting resistor (R6, R8 or R10) to form a column branch;

all of the contacts of the control buttons at the other side are connected to a matrix row signal port of the microprocessor via a row branch resistor after being connected in parallel to form a row branch;

the matrix column signal port is also connected to a contact of another control button via a column branch current limiting resistor; and all of the contacts of the other control buttons at the other side are connected to another matrix row signal port of the microprocessor via another row branch resistor after being connected in parallel to form another row branch.

The number of the column branches is less than or equal to the number of the signal ports of the matrix column of the microprocessor.

The number of the row branches is less than or equal to the number of the signal ports of the matrix row of the microprocessor.

The object of the present invention can be further achieved wherein, in the reciprocating mode control circuit of the control system according to the present invention:

the matrix column signal port of the microprocessor is connected to a cathode of a LED via a column sub-branch current limiting resistor to form a column sub-branch;

all of the anodes of the LED are connected to the matrix row signal port of the microprocessor to form a row sub-branch;

the matrix column signal port is also connected to a cathode of a LED via a column sub-branch current limiting resistor; and all of the anodes of the LED are connected to the matrix row signal port of the microprocessor to form another row sub-branch.

The number of the column sub-branches is less than or equal to the number of the column branches; and the number of the row sub-branches is less than or equal to the number of the row branches.

In the reciprocating travel control circuit, the signal power supply is connected to an on-off signal input of the microprocessor via a current limiting resistor; and the on-off signal input is grounded through a pair of contacts of a limit switch.

The invention has the following advantages and beneficial effect over existing techniques:

a. By means of using the matrix type on-off input-output signals in the reciprocating mode control circuit of the reciprocating object control system according to the present invention, it is possible to connect a plurality of on-off input-output signals to the limited number of the matrix column and row signal ports of the microprocessor. Generally, if the microprocessor is provided with m number of matrix column signal ports and n number of matrix row signal ports, the configuration of the column and row branches according to the invention can provide a maximum number of m×n on-off input signals, and the configuration of the column and row sub-branches according to the present invention can provide a maximum number of m×n on-off output signals. Therefore, a greater number of external control and display elements such as control buttons and indicating lamps can be connected to realize more control modes and thereby expand the control capability.

b. The matrix-type, on-off input-output construction used in the control circuit according to the present invention is relatively simple, which helps to achieve a tidy wiring and layout of the elements, and therefore the circuit is easy for manufacturing, assembling, troubleshooting and maintenance.

In order to better understand the invention and its objects, features and advantages a detailed description of the preferred embodiments is given hereinafter with reference to the accompanying drawings.

DETAILED DESCRIPTION OF THE PREFERRED EMBODIMENTS

In order to understand the features and the advantages according to the present invention, a control system for a reciprocating object according to this invention used for a massager is described with reference to the drawings.

Figure 1:
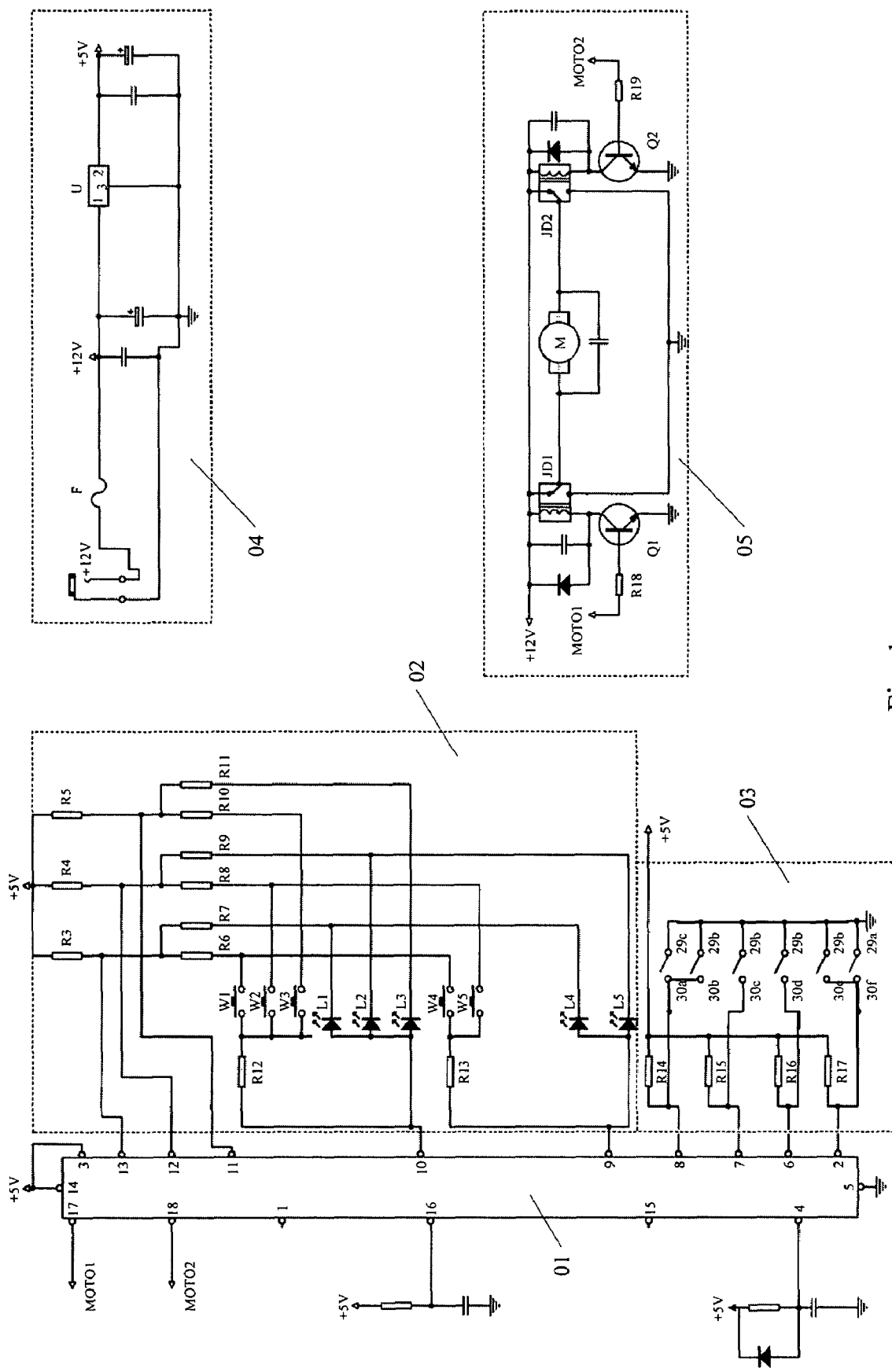
FIG. 1 is a circuit diagram of the control system for the reciprocating object used in a massager according to the present invention.

As shown in FIG. 1, the control system for the reciprocating object according to the present invention used in a massager comprises a microprocessor 01, a reciprocating mode control circuit 02, a reciprocating travel control circuit 03, a power supply circuit 04 and a motor driving circuit 05. The microprocessor 01 is of EM78P156EL0 type, with its pin 9 and pin 10 as signal ports of matrix rows, and with pin 11, pin 12 and pin 13 as signal ports of matrix columns. In the reciprocating mode control circuit 02, five control buttons W1, W2, W3, W4 and W5 are provided corresponding to 5 LEDs L1, L2, L3, L4 and L5 as indicating lamps of control modes.

A signal power supply (+5V) is connected to the signal port 13 of the matrix column of the microprocessor 01 via a column branch voltage dropping resistor R3, while the signal port 13 in a matrix column is connected to a contact of the control button W1 at one side via a column branch current limiting resistor R6 to form a column branch. Similarly, column branch voltage dropping resistors R4, R5, signal ports 12, 11 of the matrix column of the microprocessor 01, column branch current limiting resistors R8, R10 and the contacts of control buttons W2, W3 at one side are connected in the same manner to form another two column branches, respectively.

Contacts at another side of the control buttons W1, W2, W3 are connected to the signal port 10 of the matrix row of the microprocessor 01 by a row branch resistor R12 after being connected in parallel to form a row branch.

The signal port 13 of the matrix column is also connected to a contact of the control button W4 at one side by the column branch current limiting resistor R6. The signal port of the matrix column 12 is also connected to the contact of the control button W5 at one side by a column branch current limiting resistor R8. The contacts of the control buttons W4, W5 at another side are connected to the signal port 9 of matrix row of the microprocessor 01 via a row branch resistor R13 after being connected in parallel to form another row branch.

Because three signal ports 13, 12, 11 of the microprocessor 01 as the signal ports of the matrix column are provided in this case, three column branches can be formed at the most. Because two signal ports 10, 9 of the microprocessor 01 as the signal ports of the matrix rows are provided in this case, therefore two rows branches can be formed at the most.

The signal port 13 of the matrix column of the microprocessor 01 is connected to the cathode of a LED L1 by a column sub-branch current limiting resistor R7 to form a column sub-branch. The signal ports 12, 11 of the matrix column of the microprocessor 01, the column sub-branch current limiting resistors R9, R11 and the cathodes of the LED L2, L3 together form another two column sub-branches in the same connection manner respectively.

The anodes of the LED L1, L2 and L3 are connected to the signal port 10 of the matrix row of the microprocessor 01 to form a row sub-branch.

The signal port 13 of the matrix column is also connected to the cathode of a LED L4 via the column sub-branch current limiting resistor R7. The signal port 12 of the matrix column is also connected to a cathode of the LED L5 via the column sub-branch current limiting resistor R9. The anodes of the LED L4, L5 are connected to the signal port 9 of the matrix row of microprocessor 01 to form another row sub-branch.

Because there are three column branches and two row branches in the reciprocating mode control circuit 02 in this case, therefore three column sub-branches and two row sub-branches can be formed at the most.

In the reciprocating travel control circuit 03:

A +5V signal power supply is connected to the on-off signal input 8 of the microprocessor 01 via a current limiting resistor R14. The on-off signal input 8 is grounded through two pairs of parallel connected limited switch contacts 30a, 29c and 30b, 29b to form a top limit position protection and upper position signal branch.

The +5V signal power supply is connected to the on-off signal input 7 of the microprocessor 01 via a current limiting resistor R15. The on-off signal input 7 is grounded through one pair of limit switch contacts 30C, 29b to form an upper-middle position signal branch.

The +5V signal power supply is connected to the on-off signal input 6 of the microprocessor 01 via a limit current resistor R16. The on-off signal input 6 is grounded through a pair of limit switch contacts 30d, 29b to form a lower-middle position signal branch.

The +5V signal power supply is connected to the on-off signal input 2 of the microprocessor via a limit current resistor R17. The on-off signal input 2 is grounded through two pairs of parallel-connected limit switch contacts 30c, 29b and 30f, 29a to form a bottom limit position signal and bottom limit protection branch.

The motor drive circuit 05 is provided with 2 power triodes Q1 and Q2 with their bases connected to the control signal outputs 17 and 18 of the microprocessor 01 via base resistors R18 and R19, respectively, their collectors connected to a +12V power supply via relays JD1 and JD2, respectively, and their emitters grounded. The normally open static contacts and normally closed static contacts of the relays JD1 and JD2 are connected to the +12V power supply and the ground, respectively. Their moving contacts are connected to two ends of the driving motor M, respectively. The microprocessor 01 controls the on/off state of the power triodes Q1 and Q2, so as to determine the closed/open state of the contacts of the relays JD1 and JD2, and consequently the polarity of the power supply of the driving motor M, and finally the clockwise/counterclockwise rotation and/or stop of the driving motor M.

The power supply circuit 04 is powered by the 12V DC power supply (if a commercial power supply is used; otherwise, a AC/DC adapter should be provided separately) and directly provides a +12V power supply to the motor drive circuit 05 via a fuse F, and provides +5V signal power supply to the microprocessor 01, reciprocating mode control circuit 02 and the reciprocating travel control circuit 03 through a voltage stabilizing model U (for example, Model L7805 is used). The cathode of the power supply is grounded.

Figure 2:
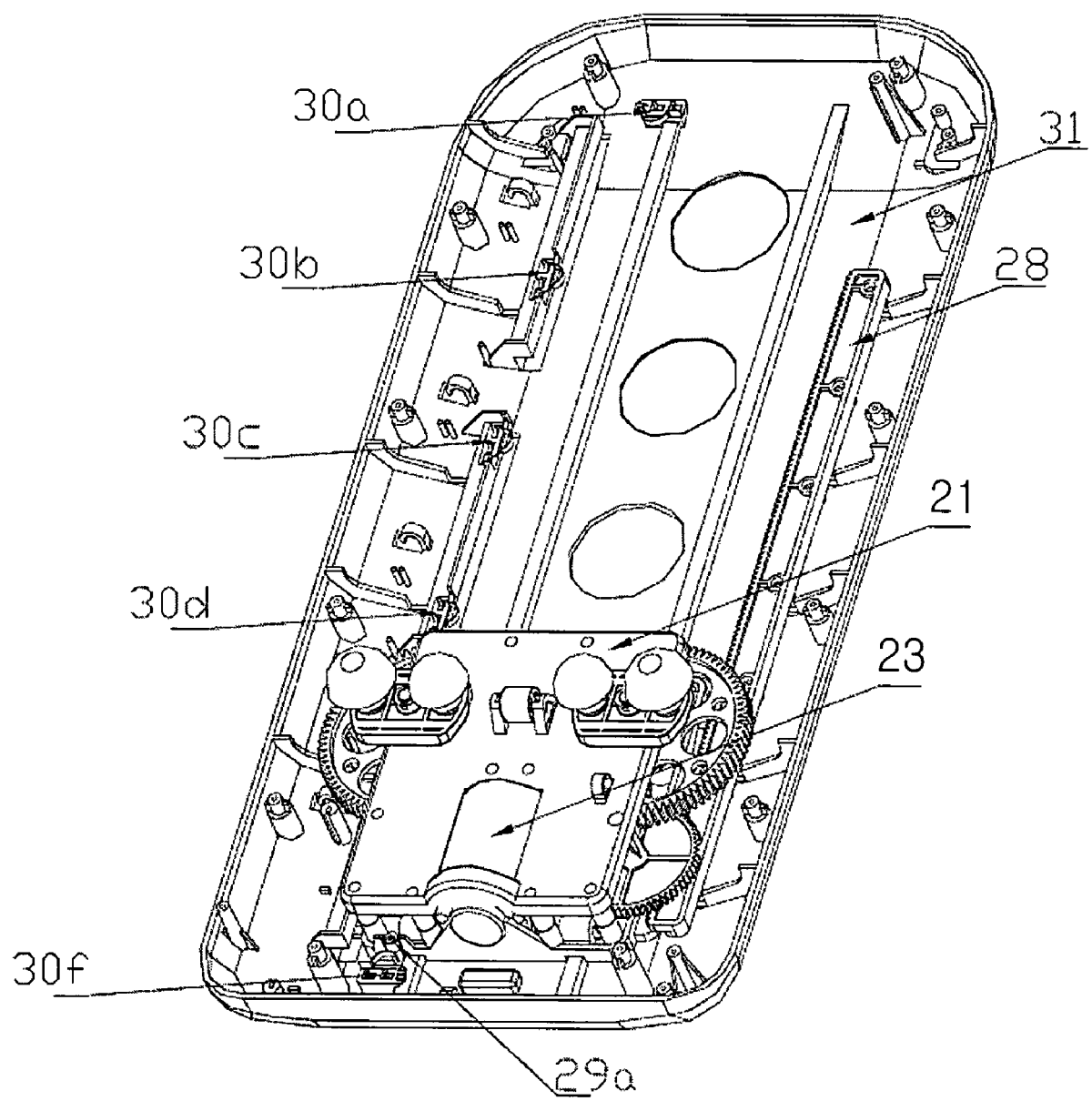
FIG. 2 is a perspective view of the traveling part of the massager using the control system for the reciprocating object according to the present invention.
Figure 3:
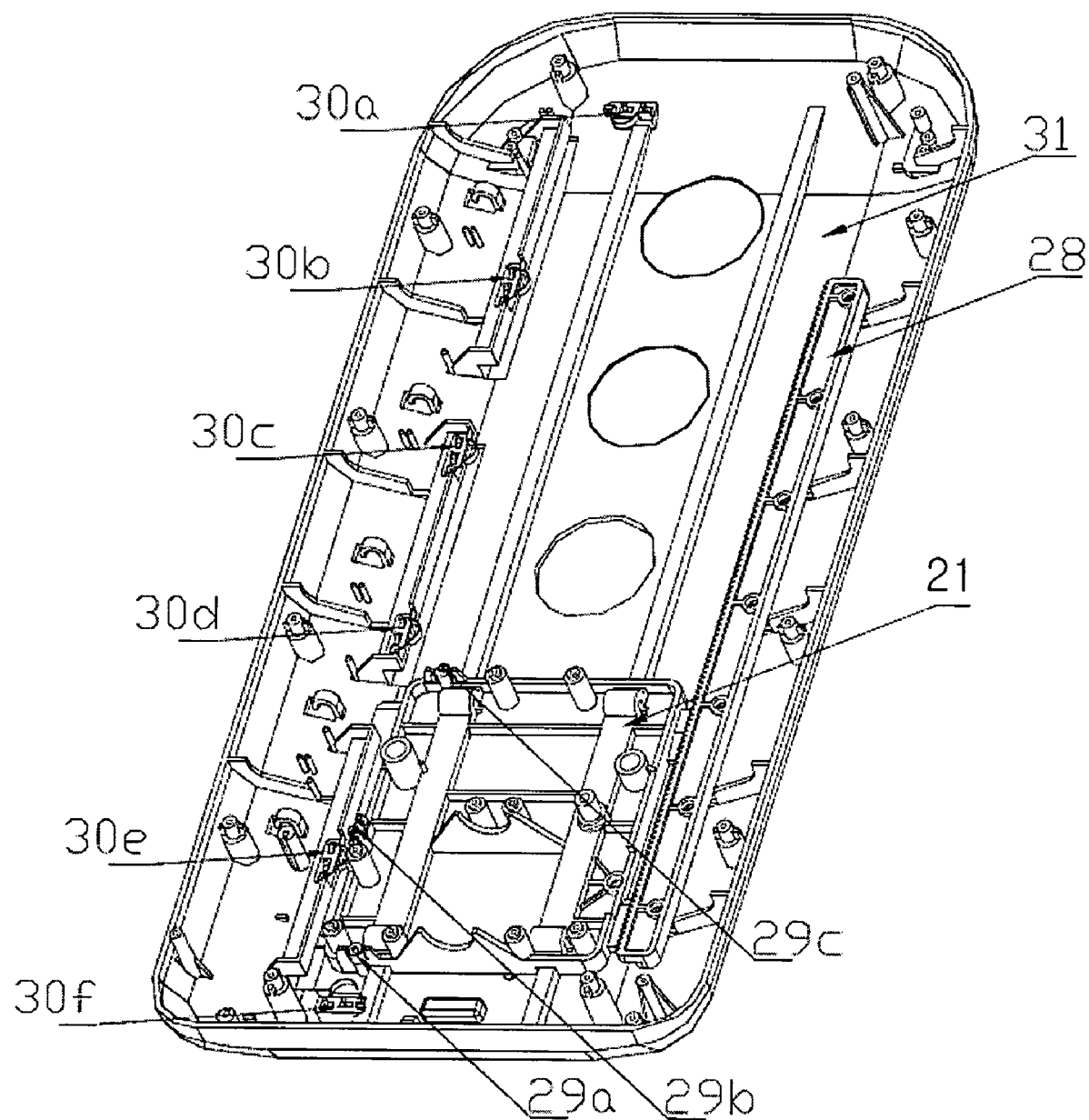
FIG. 3 is the perspective view of the construction of the traveling part of the massager without the components on the body which uses the control system for the reciprocating object, leaving only the frame of the body, according to the present invention.

The control circuit of reciprocating object according to the present invention is used to control the reciprocating movement of a massager which is shown in FIG. 2 and FIG. 3. The traveling part of the massager is composed of a body 21 and a guide plate 31. On the body 21, the driving motor 23 (i.e., the driving motor M of the motor drive circuit 05) and the driving gear group are mounted. The rack 28 is provided on the guide plate 31 with which the corresponding gear in the driving gear group is engaged. The dynamic contacts 29c, 29b and 29a of the limit switches are provided in the upper, middle and lower parts of one side of the body 21, respectively, with their static contacts 30a, 30b, 30c, 30d, 30e and 30f provided in the top, upper middle upper, middle lower, lower and bottom parts of corresponding side of the guide plate 31.

When using the massager of the present embodiment for massaging, a user first puts the traveling part of the massager on the part of a human body to be massaged (e.g., the back), then turns on the power supply, and presses the button w4. The LED L4 will light up indicating the control circuit is initialized and ready for operation. At this time, the body 21 of the traveling part of the massager is in the initial position in the lower part of the guide plate 31.

When the button W1 is pressed, the LED L1 will light up. The selected reciprocating travel mode is a repeated cycling between the upper and lower parts. At this time, the control program chooses the position signal obtained from the on-off signal input 8 of the microprocessor 01 connected to the contact pair 30b-29b of the limit switches and the on-off signal input 2 of the microprocessor 01 connected to the contact pair 30e-29b of the limit switches as return signals allowing the traveling part of the massager to reciprocate between the shoulder position and the waist position.

When the button W2 is pressed, the LED L2 will light up. The selected reciprocating travel mode is a repeated cycling between the upper and lower-middle parts. At this time, the control program chooses the position signal obtained from the on-off signal input 8 of the microprocessor 01 connected to the contact pair 30b-29b of the limit switches and the on-off signal input 6 of the microprocessor 01 connected to the contact pair 30d-29b of the limit switches as return signals allowing the traveling part of the massager to reciprocate between the shoulder position and the lower back position.

When the button W3 is pressed, the LED L3 will light up. The selected reciprocating travel mode is a repeated cycling between the upper-middle and lower-middle parts. At this time, the control program choose the position signals obtained from the on-off signal input 7 of the microprocessor 01 connected to the contact pairs 30c-29b of the limit switches and the on-off signal input 2 of the microprocessor 01 connected to the contact pair 30e-29b of the limit switches as return signals, allowing the traveling part of the massager to reciprocate between the upper position and the waist position.

When the button W5 is pressed, the LED L5 will light up. The selected reciprocating travel mode is a cycling movement between the upper and lower parts. At this time, the control program chooses the position signal obtained from the on-off signal input 8 of the microprocessor 01 connected to the contact pair 30b-29b of the limit switches as return signal, and chooses the on-off signal input 2 of the microprocessor 01 connected to the contact pair 30e-29b of the limit switches as stop signals, allowing the traveling part of the massager to reciprocate from the waist position to the shoulder position and then again return to the waist position, and then stop for a demonstration.

When the body 21 moves upward to the top of the guide plate 31, the position signal exerted by the electrical communication caused by the contact between the moving contact 29c on the upper part of the body 21 and the normal contact 30a on the top of the guide plate 31 reverses the rotation of the driving motor to provide a limit protection to the top limit position on the traveling part of the massager. When the body 21 moves downward to the bottom of the guide plate 31, the position signal exerted by the electrical communication caused by the contact between the moving contact 29a on the upper part of the body 21 and the normal contact 30f on the top of the guide plate 31 reverses or stops the rotation of the driving motor to provide a limit protection to the bottom limit position on the traveling part of the massager.

The above description is only for preferred embodiments according to the present invention and does not provide any limitations to the invention. While the invention has been explained by means of the preferred embodiments, it is not intended to restrict the invention. One of ordinary skill familiar with the art will readily realize that various changes and modifications can be made without departing from the spirit and scope of the present invention. All the changes and modifications to the preferred embodiments according to the present invention fall into the scope of the present invention as a whole.

I claim:

1. A control system for a reciprocating object, comprising:
a microprocessor having matrix-type, on-off signal input/output ports;
a reciprocating mode control circuit;
a reciprocating travel control circuit, the reciprocating mode control circuit and the reciprocating travel control circuit being operatively connected to the on-off signal input/output ports of the microprocessor;
a motor driving circuit; and
a power supply circuit providing a signal power supply to the microprocessor, the reciprocating mode control circuit and the reciprocating travel contort circuit, and providing a power supply to the motor driving circuit, wherein
control signal outputs of the microprocessor are connected to inputs of the motor driving circuit,
wherein, in the reciprocating mode control circuit, the signal power supply is connected to a matrix column signal port of the microprocessor via a column branch voltage dropping resistor, the matrix column signal port is connected to a contact of a first column control button at one side via a column branch current limiting resistor to form a first column branch,
wherein all contacts of first row control buttons at the other side are connected to a matrix row signal port of the microprocessor via a row branch resistor after being connected in parallel to form a row branch,
wherein the matrix column signal port is further connected to a contact of a second column control button via a column branch current limiting resistor,
wherein all contacts of second row control buttons at the other side are connected to another matrix row signal port of the microprocessor via another row branch resistor after being connected in parallel to form another row branch,
wherein a number of the column branches is less or equal to a number of the signal ports of the matrix columns of the microprocessor, and
wherein a number of the row branches is less or equal to a number of the signal ports of the matrix rows of the microprocessor.

2. The control system of claim 1, wherein, in the reciprocating mode control circuit:

the matrix column signal port of the microprocessor is connected to a cathode of a LED via a column sub-branch current limiting resistor to form a column sub-branch, all of the anodes of the LED are connected to the matrix row signal port of the microprocessor to form a row sub-branch, the matrix column signal port is also connected to a cathode of a LED via a column sub-branch current limiting resistor, all of the anodes of the LED are connected to the matrix row signal port of the microprocessor to form another row sub-branch, a number of the column sub-branches is less than or equal to the number of the column branches, and a number of the row sub-branches is less than or equal to the number of the row branches.

3. The control system of claim 2, wherein, in the reciprocating travel control circuit:

the signal power supply is connected to a on-off signal input of the microprocessor via a current limiting resistor, and the on-off signal input is grounded through a pair of contacts of a limit switch.

4. The control system of claim 1, wherein, in the reciprocating travel control circuit:

the signal power supply is connected to a on-off signal input of the microprocessor via a current limiting resistor, and the on-off signal input is grounded through a pair of contacts of a limit switch.

5. The control system of claim 1, wherein, in the reciprocating mode control circuit:

a LED circuit is connected between the matrix column signal ports and the matrix row signal ports of the microprocessor.

6. The control system of claim 1, wherein, in the reciprocating travel control circuit:

the signal power supply is connected to a on-off signal input of the microprocessor, and the on-off signal input is grounded through a limit switch.

7. A control system for a reciprocating object, comprising:

a microprocessor having a plurality of matrix-type, on-off signal input/output ports;

a reciprocating mode control circuit;

a reciprocating travel control circuit, the reciprocating mode control circuit and the reciprocating travel control circuit being operatively connected to the on-off signal input/output ports of the microprocessor;

a motor driving circuit; and a power supply circuit operatively connected to the microprocessor, the reciprocating mode control circuit, the reciprocating travel control circuit, and the motor driving circuit, wherein the microprocessor is connected via control signal outputs to inputs of the motor driving circuit, the power supply circuit is connected via the reciprocating mode control circuit to matrix column signal ports of the microprocessor, the matrix column signal port being connected to a first set of control buttons via a matrix column branch circuit, the microprocessor further includes matrix row signal ports connected to a second set of control buttons via a matrix row branch circuit, the matrix column branch circuit having a plurality of column branches and the matrix row branch circuit having a plurality of row branches, and wherein a number of the column branches is less or equal to a number of the matrix column signal ports of the microprocessor, and a number of the row branches is less or equal to a number of the matrix row signal ports of the microprocessor.

* * * * *